(12) United States Patent
Ray

(10) Patent No.: US 9,903,116 B2
(45) Date of Patent: Feb. 27, 2018

(54) ACOUSTICAL GYPSUM WALLBOARD

(71) Applicant: United States Gypsum Company, Chicago, IL (US)

(72) Inventor: Suman Sinha Ray, Chicago, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 15/148,035

(22) Filed: May 6, 2016

(65) Prior Publication Data

US 2017/0081842 A1  Mar. 23, 2017

Related U.S. Application Data

(60) Provisional application No. 62/221,169, filed on Sep. 21, 2015.

(51) Int. Cl.
| | |
|---|---|
| *E04B 1/86* | (2006.01) |
| *E04C 2/04* | (2006.01) |
| *B32B 13/04* | (2006.01) |
| *E04B 9/04* | (2006.01) |
| *E04C 2/12* | (2006.01) |
| *E04C 2/24* | (2006.01) |
| *B32B 13/00* | (2006.01) |
| *E04B 1/84* | (2006.01) |

(52) U.S. Cl.
CPC .............. *E04C 2/043* (2013.01); *B32B 13/00* (2013.01); *B32B 13/04* (2013.01); *B32B 13/042* (2013.01); *B32B 13/047* (2013.01); *E04B 9/045* (2013.01); *E04C 2/12* (2013.01); *E04C 2/24* (2013.01); *B32B 2307/10* (2013.01); *B32B 2607/00* (2013.01); *E04B 1/86* (2013.01); *E04B 2001/8461* (2013.01)

(58) Field of Classification Search
CPC ........ E04B 1/8409; E04B 1/8209; E04B 1/86; E04B 2001/8461
USPC ........................................ 181/291
See application file for complete search history.

(56) References Cited

U.S. PATENT DOCUMENTS

| | | | |
|---|---|---|---|
| 1,769,519 A | 7/1930 | King et al. | |
| 2,806,811 A | 9/1957 | Von Hazmburg | |
| 4,040,213 A * | 8/1977 | Capaul ................ | E04B 1/8409 181/291 |
| 4,853,085 A | 8/1989 | Johnstone et al. | |
| 7,181,891 B2 * | 2/2007 | Surace ...................... | B32B 7/12 52/309.9 |
| 7,799,410 B2 * | 9/2010 | Tinianov ................ | B32B 15/08 181/290 |
| 7,921,965 B1 * | 4/2011 | Surace ...................... | B32B 7/12 181/285 |
| 8,197,952 B2 | 6/2012 | Yu et al. | |
| 8,974,925 B1 * | 3/2015 | Cao .......................... | E04B 1/94 428/294.7 |
| 2003/0178249 A1 * | 9/2003 | Adamson ................ | E04F 15/20 181/285 |

(Continued)

FOREIGN PATENT DOCUMENTS

WO   WO 2009/117019   9/2009

*Primary Examiner* — Forrest M Phillips
(74) *Attorney, Agent, or Firm* — Greer, Burns & Crain, Ltd.; Pradip Sahu; Phillip T. Petti

(57) ABSTRACT

This invention provides acoustical building panels and methods for imparting the acoustical property to wallboard with help of a compliant coating.

19 Claims, 15 Drawing Sheets

(56) References Cited

U.S. PATENT DOCUMENTS

| | | | |
|---|---|---|---|
| 2005/0050846 A1* | 3/2005 | Surace | B32B 7/12 |
| | | | 52/782.1 |
| 2007/0227814 A1* | 10/2007 | Schabel, Jr. | B60R 13/08 |
| | | | 181/288 |
| 2009/0107059 A1* | 4/2009 | Kipp | C04B 28/26 |
| | | | 52/144 |
| 2010/0304111 A1* | 12/2010 | Vulpitta | B32B 27/12 |
| | | | 428/220 |
| 2014/0273687 A1* | 9/2014 | Garvey | E04B 1/86 |
| | | | 442/120 |

* cited by examiner

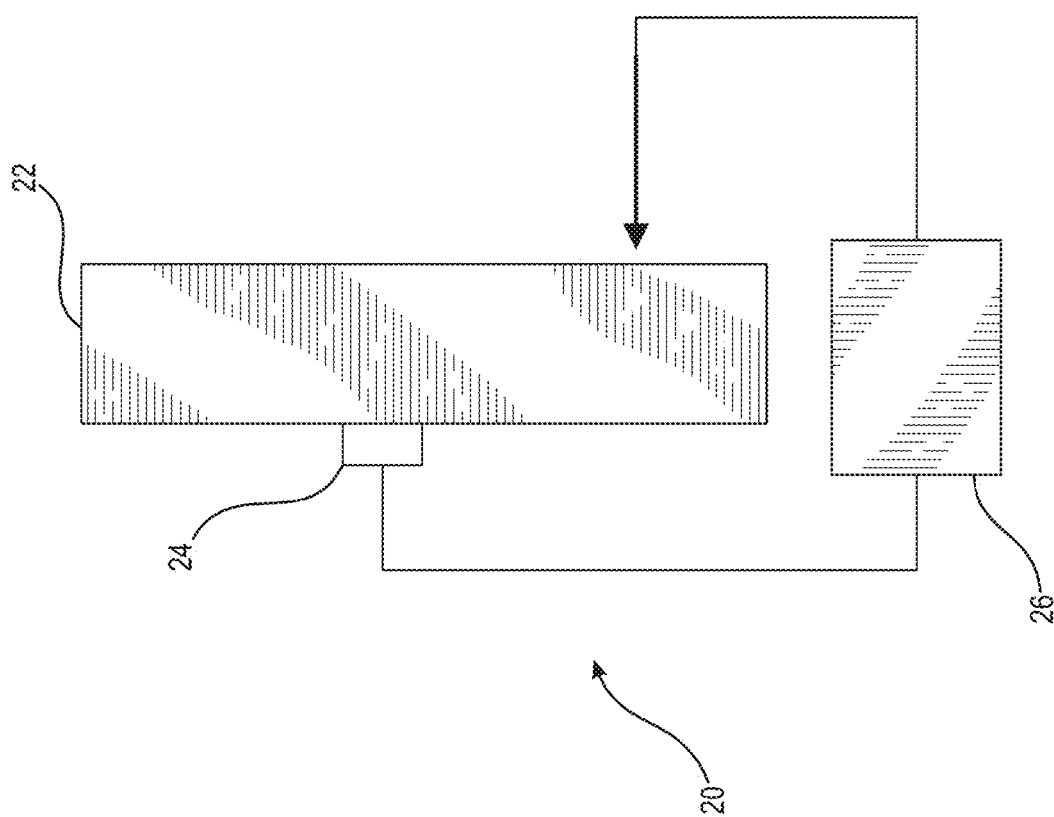

ACOUSTICAL GYPSUM WALLBOARD

TECHNICAL FIELD

This invention relates to building construction panels and methods for obtaining acoustical gypsum wallboard.

BACKGROUND

In building construction, different types of panels for forming interior walls, exterior walls and ceilings are used. Typically, panels (also referred to as boards) are affixed to framing members also known as studs such as in balloon framing arrangements.

Often used in construction of interior walls, is a gypsum board faced with paper. Typically, this board (also referred to as wallboard or drywall) is made by preparing a slurry comprising calcined gypsum, water and other components. The gypsum slurry is then sandwiched between two sheets of paper, forming a gypsum core between two paper cover sheets. The gypsum core is then allowed to set. U.S. Pat. Nos. 8,197,952, 4,853,085, and 1,769,519 assigned to United States Gypsum Company, provide gypsum wallboard and methods of making it.

One of the requirements for gypsum wallboard is to provide an acoustic barrier between two adjacent rooms, including in multi-unit dwellings such as apartment buildings and hotels, and dwellings located next to a commercial building or an airport.

As wallboards differ in their compositions, so does their ability to provide an acoustical barrier. Accordingly, wallboards are classified based to their ability to diminish (dampen) sound transmission through a wall. This wallboard characteristic is known as Sound Transmission Class (STC) which can be measured for each wallboard according to ASTM standard method E90 "Standard Test Method Laboratory Measurement of Airborne Sound Transmission Loss of Building Partitions and Elements."

ASTM E413 "Classification for Sound Insulation" can be used to calculate a STC rating for a particular wallboard structure. The higher is the STC value of a particular wallboard, the better this wallboard is at absorbing noise. Building construction codes may require wallboard with a certain minimum STC value for each particular application.

One strategy for obtaining a wallboard with a high STC value is to produce wallboard with dense gypsum core. While this method may improve the acoustical properties of wallboard, it also produces wallboard which is heavy, while lighter wallboard would be a better solution for improved job site efficiency.

Another strategy is to laminate two gypsum boards together or to create a multilayer structure. U.S. Pat. No. 7,799,410 discloses a laminated panel in which two different layers are glued together. However, laminated boards are extremely difficult to process for scoring which may result in lower productivity and decreased job site efficiency.

It would be advantageous to have a method by which the same basic wallboard can be customized for different purposes with respect to sound absorption.

SUMMARY

The present invention provides a coating composition and method by which a wallboard can be made into an acoustical wall panel with a high STC value and suitable for applications in which significant noise reduction is needed. One embodiment provides an acoustical wallboard comprising: a wallboard comprising a gypsum core sandwiched between a first paper cover sheet and a second paper cover sheet, wherein the first paper cover sheet is the facer and the second paper cover sheet is the backer, a compliant coating applied over the backer; and a third paper sheet applied over the compliant coating. In further embodiments, the gypsum core is sandwiched between the facer and the compliant coating such that the compliant coating is applied directly over the gypsum core; and a paper sheet is applied over the compliant coating.

In some embodiments, the compliant coating comprises a binder and a combination of first particles and second particles, and wherein the first particles are sound-compliant and the second particles are sound-stiff.

At least some acoustical wallboard coated with the compliant coating has the sound transmission loss property significantly improved in the high-frequency range in comparison to wallboard without the compliant coating.

Further embodiments include an acoustical wallboard comprising: a wallboard comprising a gypsum core sandwiched between a first paper cover sheet and a second paper cover sheet, wherein the first paper cover sheet is the facer and the second paper cover sheet is the backer, a compliant coating comprising a binder, sound-compliant particles and sound-stiff particles, wherein the compliant coating is applied over the backer; and a third paper sheet applied over the compliant coating, wherein the compliant coating and the third paper cover sheet create together a laminated structure. In some embodiments, the laminated structure is repeated at least two times. In some embodiments, at least one of paper cover sheets is replaced with a polymeric mat selected from the group consisting of a fiber mat and synthetic paper mat. In some embodiments, the molar ratio of sound-compliant particles to sound still particles can be in the range from 1:1 to 1:1,000. In other embodiments, the molar ratio of sound-compliant particles to sound still particles can be in the range from 1,000:1 to 1:1.

A binder in the compliant coating can be selected from the group consisting of glue, starch, a latex polymer and any combination thereof. Various glues are suitable, including polyvinyl-acetate based glue, cellulose-based glue and any combination thereof.

In some embodiments, the compliant coating comprises rubber particles and silica particles. In further embodiments, sound compliant particles in the coating can be selected from the group consisting of nitrile rubber, butyl rubber, ethylene propylene diene monomer (EPDM), natural rubber compounds, cotton fibers, organic fibers, inorganic fibers, polypropylene fibers, air-filled glass beads, polystyrene beads, polystyrene foam and any combination thereof.

In some embodiments, sound-stiff particles can be selected from the group consisting of silica particles, clay particles, calcium carbonate, perlite, gas-filled microspheres, hollow microspheres, cenospheres, inorganic glues and any combination thereof.

At least in some embodiments, the compliant coating comprises rubber tire scrap particles, wallpaper paste and water glass.

Further embodiments provide a method of imparting sound-absorbing properties to a gypsum wallboard. This method comprises the following steps: obtaining a gypsum wallboard; applying a compliant coating comprising a binder and a combination of first sound-compliant particles and second sound-stiff particles; and placing a paper cover sheet over the compliant coating.

A method of making a gypsum board, the method comprising: formulating a gypsum slurry from at least water and calcined gypsum; dispensing the gypsum slurry on a first paper cover sheet, the facer; rolling a second paper cover sheet, the backer, over the gypsum slurry; applying a compliant coating which comprises a binder, sound-compliant particles and sound-stiff particles over the backer sheet; and rolling a third paper cover sheet over the compliant coating.

BRIEF DESCRIPTION OF THE DRAWINGS

FIG. 5A is a schematic of an experimental system for measuring frequency response from a building panel.

DETAILED DESCRIPTION

This invention provides a coating composition and method for imparting sound absorption properties to wallboard. It also provides gypsum wallboard coated with a compliant coating and improved acoustical properties.

The compliant coating comprises a binder and a combination of sound-compliant particles and sound-stiff particles. The compliant coating composition and method can be used with any wallboard, including X wallboard which provides no less than one-hour fire resistance when tested in specified building assemblies/systems in a laboratory setting under certain controlled conditions and pursuant to certain ASTM procedures.

Figure 1:
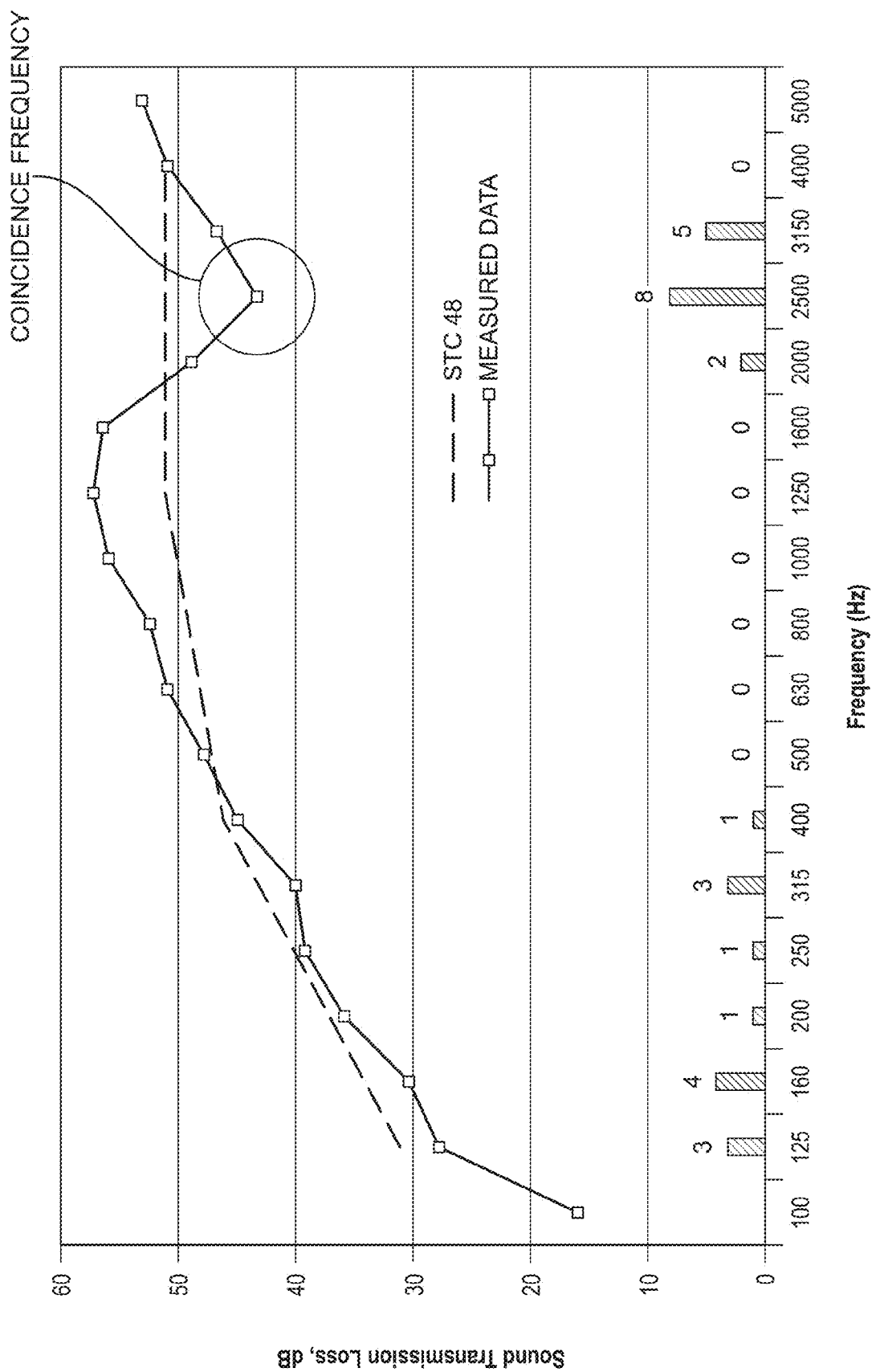
FIG. 1 reports a comparative analysis of sound transmission loss as estimated (the STC48 curve) versus as measured (the measured data curve) with deficiencies shown as bars at the bottom of the chart.

As can be appreciated from FIG. 1, sound transmission loss can be measured as a function of sound frequency. A sound transmission loss curve can be plotted as the measured ratio in decibels (dB) of the airborne sound power incident on a partition to the sound power transmitted by the partition and radiated on the other side of the partition in each one-third octave band.

The measurements in FIG. 1 for an X wallboard assembly are shown as the measured data curve. As can be appreciated from FIG. 1, there is a significant dip at about 2500 HZ, defined as coincidence frequency, in the measured data curve in comparison to the standardized theoretical STC 48 curve. Without wishing to be bound by a theory, the significant decrease in the sound absorption at the 2500 HZ frequency results at least in part from the wavenumber of the wallboard and air becoming comparable, which leads to sound transferring through the partition effortlessly. This leads to a sudden and significant decrease in dampening properties of wallboard for high-frequency sounds.

One embodiment of this invention provides a method in which a coating is applied to wallboard such that the elasticity/stiffness of wallboard is altered, and this application changes the wavenumber of wallboard such that the coated wallboard is no longer in synchrony with the wavenumber created by air at high frequencies.

Figure 2:
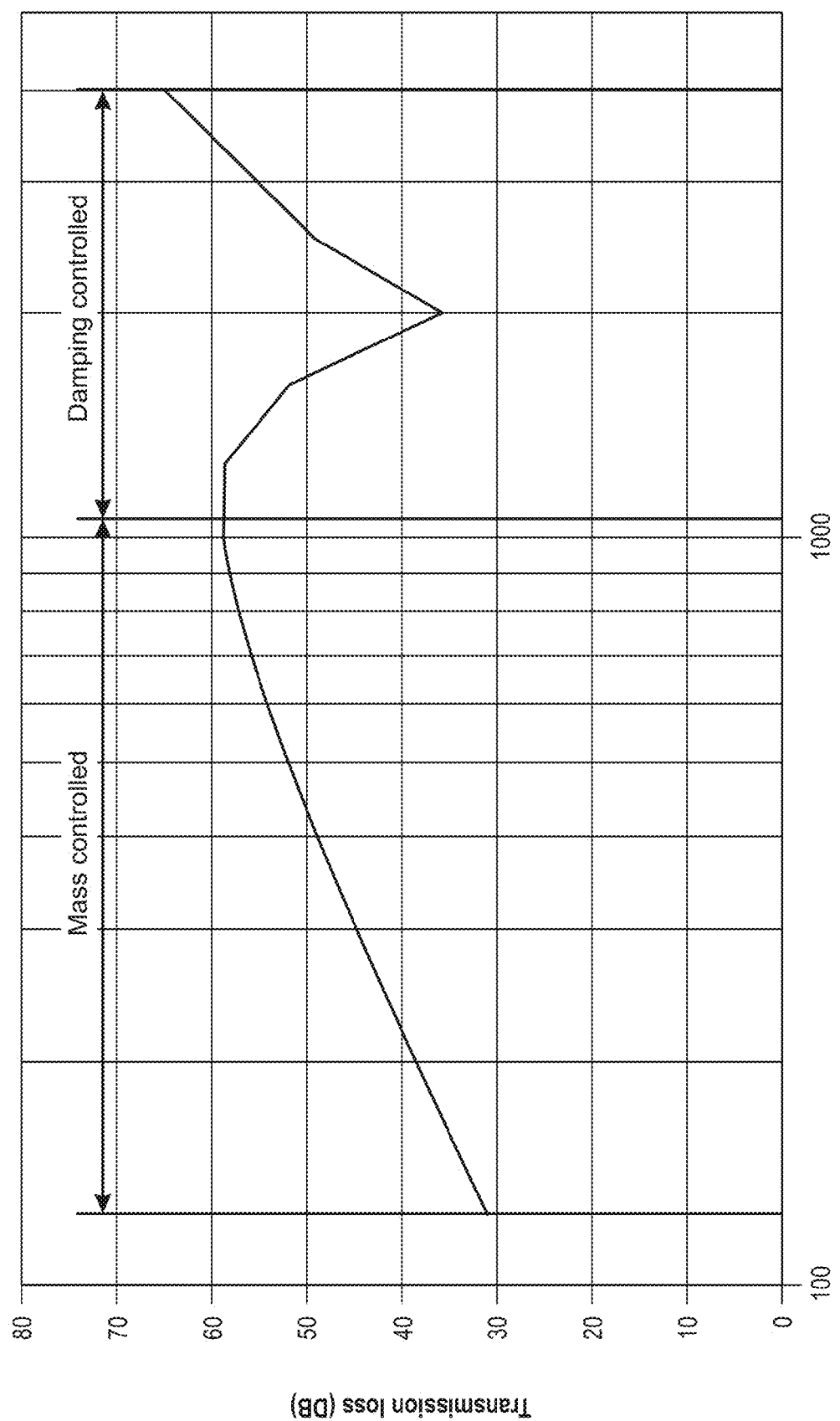
FIG. 2 is a schematic of a transmission loss curve of a gypsum wallboard.

FIG. 2 is a schematic of a transmission loss curve of a gypsum wall system. Without wishing to be bound by a theory, a typical sound transmission loss curve consists of two domains—(a) mass controlled [~100-1000 Hz] and (b) damping controlled [>1000 Hz]. These domains are not sharply divided and can extend beyond the frequency ranges, but the order of magnitudes are similar. When the wallboard's wavenumber becomes different from that of air because of the applied coating or otherwise, sound cannot transmit easily. This results in higher transmission loss and higher STC which is a desired property in building construction as it reduces noise.

One embodiment provides a method which reduces or smoothens the dip (the decrease in sound absorption) within the high frequency range (1500-4000 Hz) and improves the sound transmission loss property of wallboard at the high frequency range.

Another embodiment provides wallboard with a higher damping coefficient and improved sound transmission loss. In further embodiments, the sound transmission loss is particularly improved in the high frequency range.

Further embodiment provides a method by which the sound transmission loss in the high frequency range is improved by increasing a damping coefficient of gypsum wallboard.

Sound transmission through gypsum wallboard may depend on three factors: mass/unit area which measures density; Young's modulus which is a measure of elasticity, equal to the ratio of the stress acting on a substrate to the strain produced; and a damping coefficient.

Figure 3A:
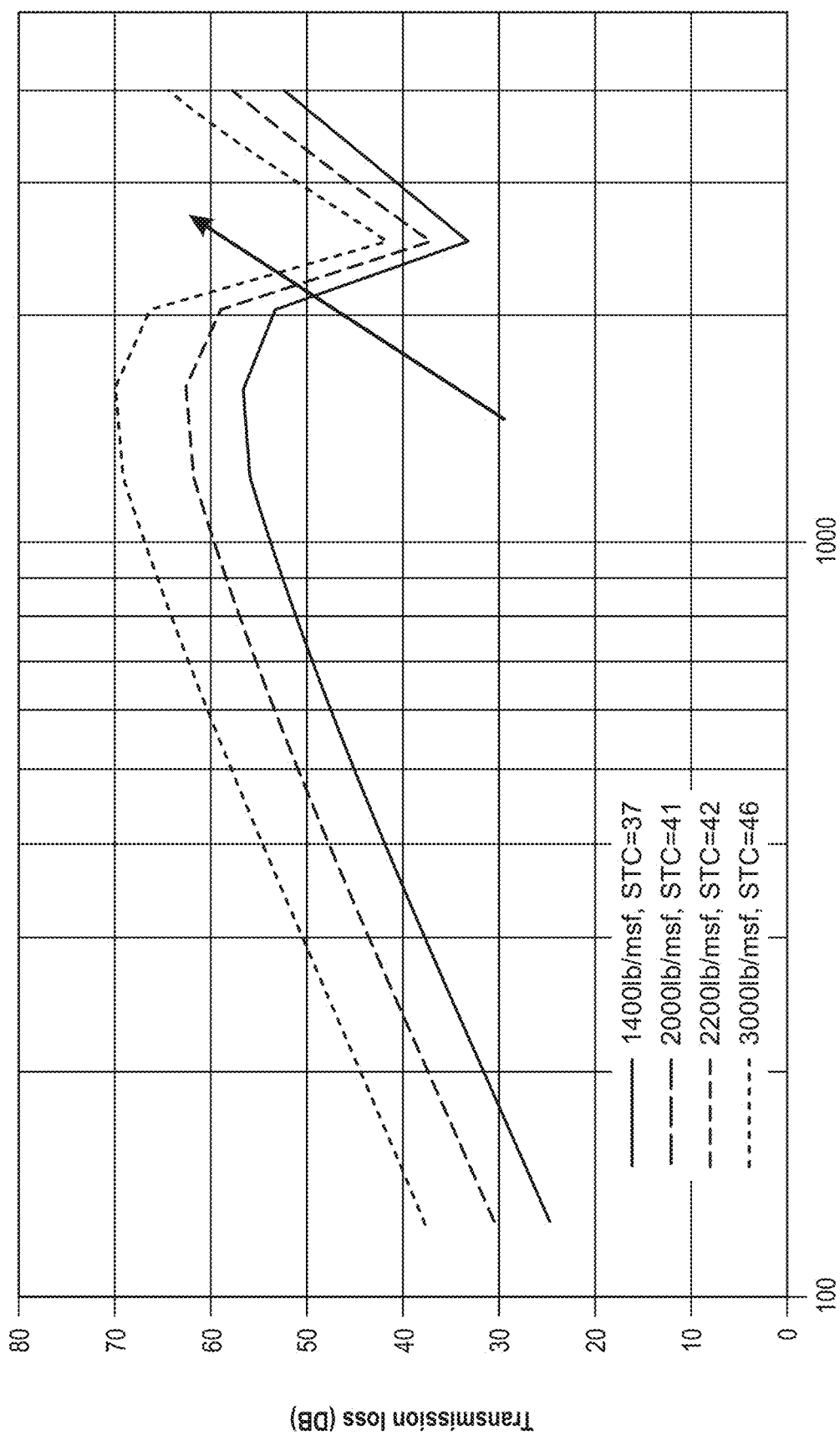
FIGS. 3A-3C are theoretical calculations for sound transmission loss with varying (FIG. 3A) mass/unit area, (FIG. 3B) Young's modulus and (FIG. 3C) damping co-efficient. The arrow shows the direction of increasing STC.

As shown in Table 1 below, the STC value can be calculated for gypsum boards with various mass/unit areas. Increasing the mass/unit area value, increases the STC of wallboard. This point is further supported by graphs in FIG. 3A, where sound transmission loss is plotted as a function of sound frequency for 4 gypsum boards which differ from each other by their mass/unit area values. As can be appreciated from FIG. 3A, a gypsum wallboard with a higher mass/unit area value absorbs sound better than a gypsum wallboard with a lower mass/unit area value.

Figure 3B:
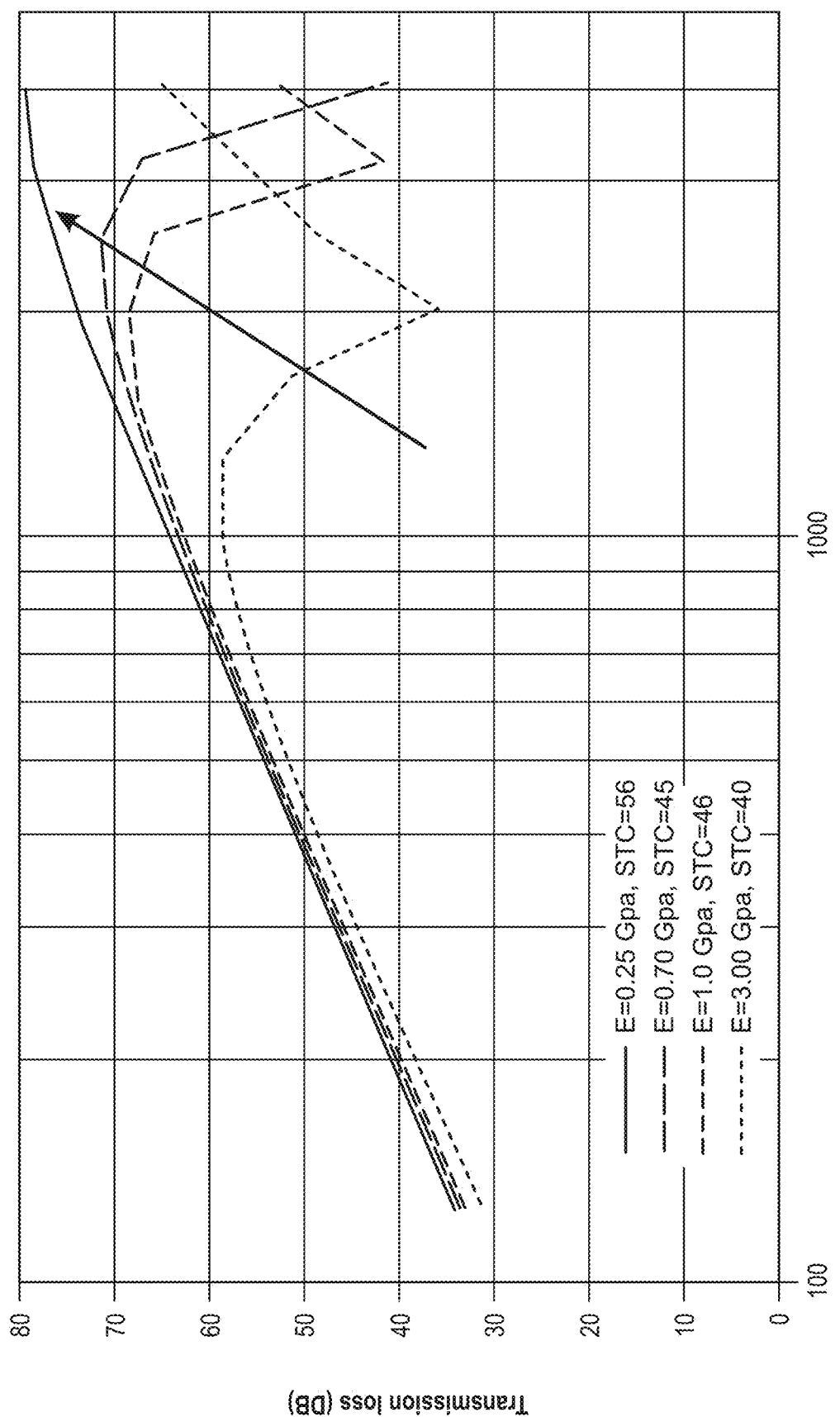

As also shown in Table 1 below, the STC value can be calculated for gypsum wallboards with the same mass/unit area value and the same damping coefficient, but at different Young's modulus. As can be further appreciated from FIG. 3B, as the Young's modulus increases, the effective STC value decreases.

Figure 3C:
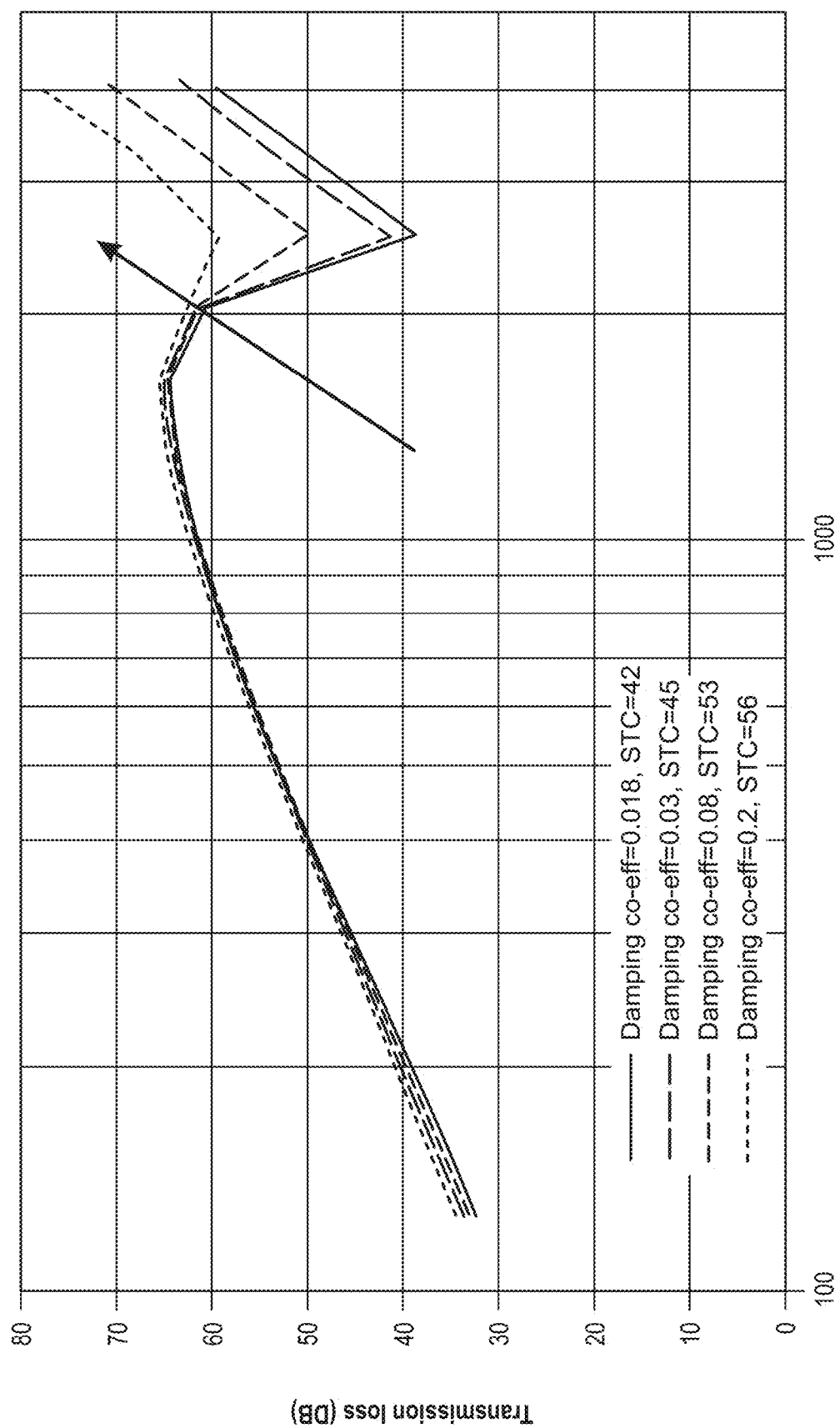

With respect to a damping co-efficient and as shown in Table 1 and in FIG. 3C, increasing the damping co-efficient leads to an increase in the effective STC value.

TABLE 1

Parametric study of effective STC value

| Parametric Study | Description of the parameters | STC |
| --- | --- | --- |
| Effect of mass/unit area (damping co-efficient = 0.018) | Mass/unit area = 1400 lb/msf | 37 |
| | Mass/unit area = 2000 lb/msf | 41 |
| | Mass/unit area = 2200 lb/msf | 42 |
| | Mass/unit area = 3000 lb/msf | 46 |
| Effect of Young's modulus (mass/unit area = 2200 lb/msf and damping co-efficient = 0.018) | Young' modulus = 0.25 GPa | 56 |
| | Young' modulus = 0.70 GPa | 45 |
| | Young' modulus = 1.00 GPa | 46 |
| | Young' modulus = 3.00 GPa | 40 |
| Effect of damping coefficient (mass/unit area = 2200 lb/msf) | Damping co-efficient = 0.018 | 42 |
| | Damping co-efficient = 0.03 | 45 |
| | Damping co-efficient = 0.08 | 53 |
| | Damping co-efficient = 0.2 | 56 |

Figure 4A:
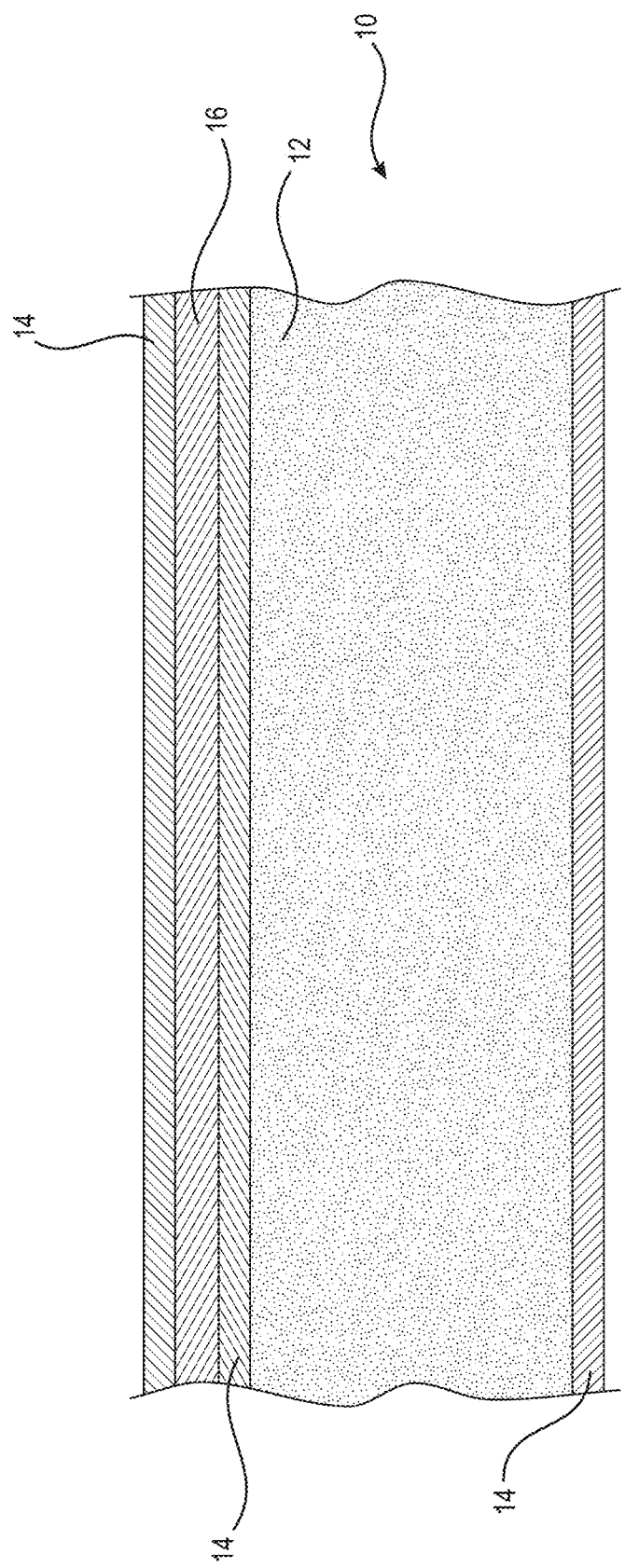
FIG. 4A is a schematic of an acoustical gypsum wallboard coated with a compliant coating.

One embodiment provides an acoustical gypsum wallboard as shown in FIG. 4A, generally 10. As shown in FIG. 4A, gypsum core 12 is sandwiched between two paper cover sheets 14, one of these paper cover sheets will be facing inside of a room after installation and this first paper cover sheet is called the facer, the second paper cover sheet will be facing outside of the room after installation and this second paper cover sheet is called the backer.

As shown in FIG. 4A, a compliant coating 16 is applied over the backer paper cover sheet 14 which will be facing outside the room after installation. Another, third, paper cover sheet 14 is then placed to cover the compliant coating 16. It will be appreciated that while in the embodiment of FIG. 4A, there is only one layer of the compliant coating 16 applied to wallboard, in other embodiments several layers can be applied such that each coating layer is sandwiched between paper cover sheets 14.

Figure 4B:
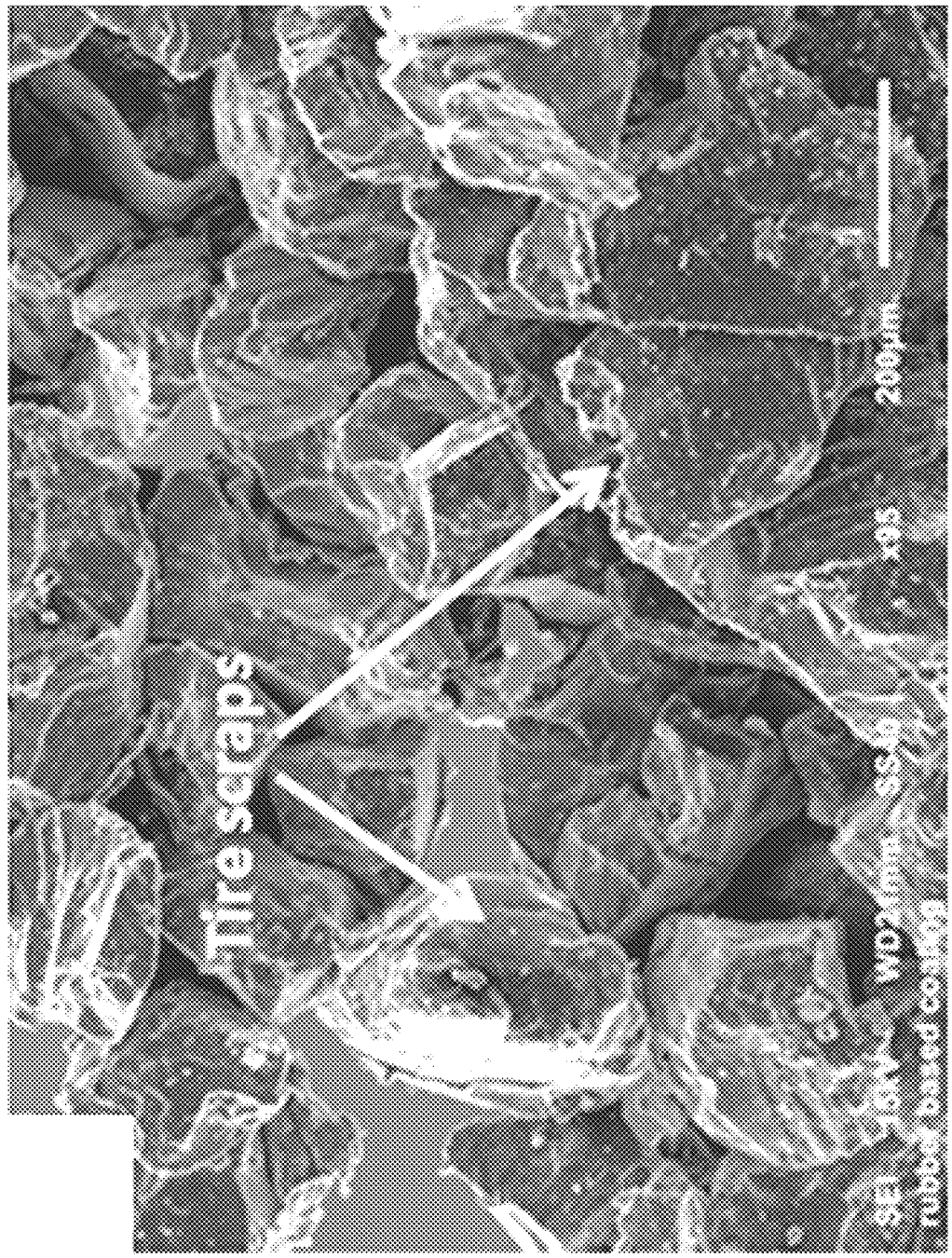
FIGS. 4B and 4C are SEM images of the compliant coating.
Figure 4C:
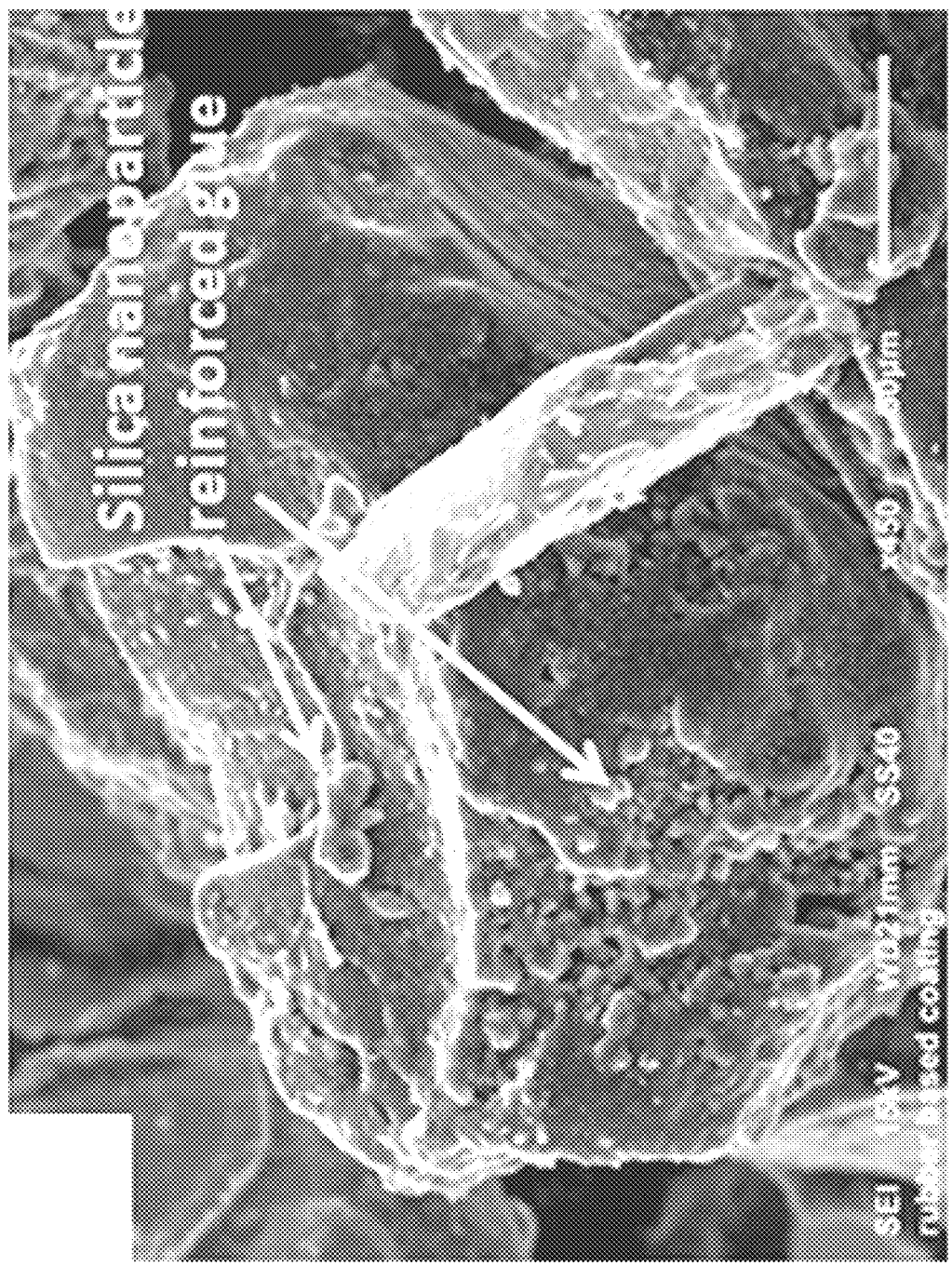
Figure 4D:
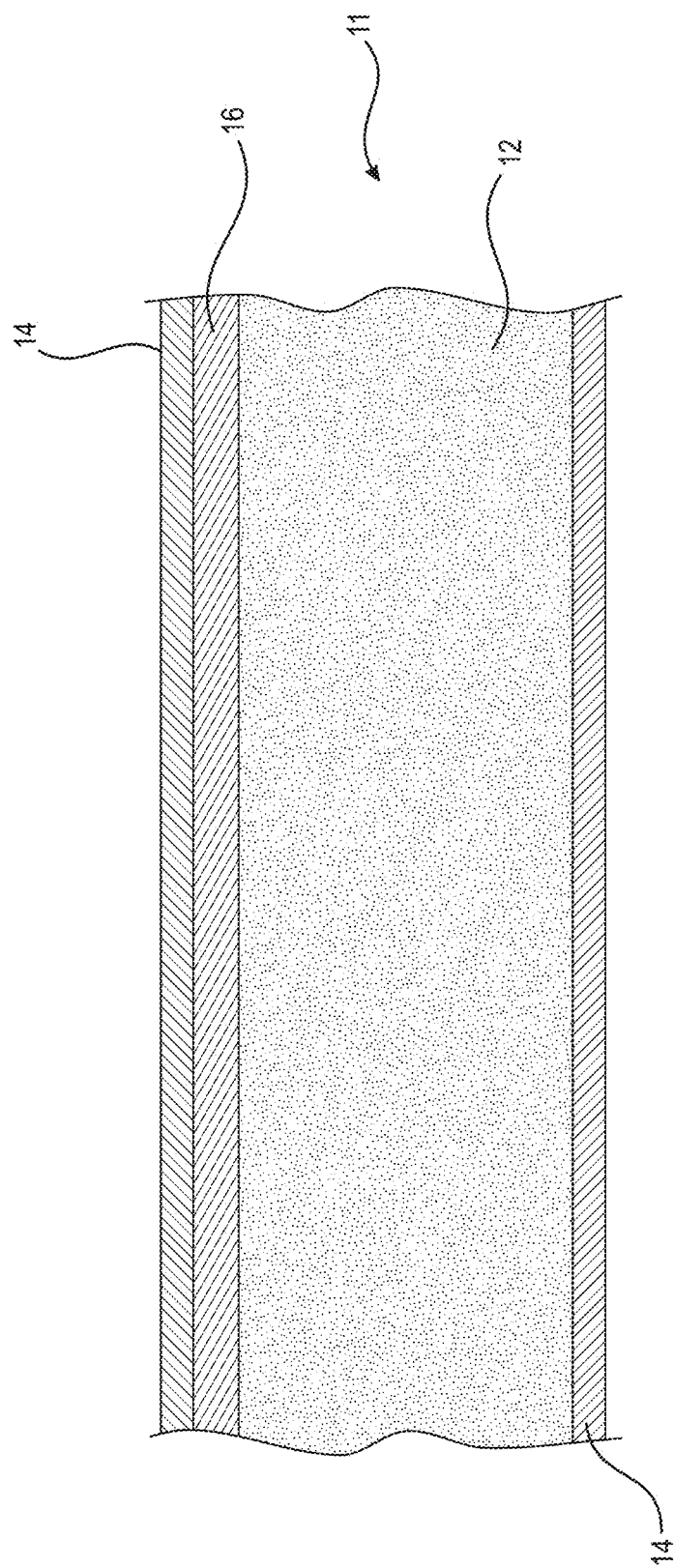
FIG. 4D is a schematic of another embodiment of an acoustical gypsum wallboard coated with a compliant coating.

Another embodiment provides an acoustical gypsum wallboard as shown in FIG. 4D, generally 11. As shown in FIG. 4D, gypsum core 12 is sandwiched between the first paper cover sheet 14, the facer, and the compliant coating 16 is applied directly over the gypsum core 12 on the other side. A second paper cover sheet 14 is then applied over the compliant coating 16.

In some embodiments, a second compliant coating layer is applied over the third paper cover sheet and another paper cover sheet is applied over the second compliant coating layer. This laminated structure—compliant coating/paper cover sheet can be repeated as many times as needed.

In some embodiments, all paper cover sheets are made from the same paper. In other embodiments, the paper cover sheet facing inside the room is different from the paper cover sheets applied to the back side of gypsum wallboard. In further embodiments, at least one of the paper cover sheets 14 can be replaced with a polymeric mat or some other cover sheet such as for example, a fiber mat or synthetic paper mat.

The gypsum core 12 can be prepared from calcined gypsum mixed with water and other components, including, but not limited to, binders, fillers, defoamers, fibers, foam, dispersants, setting retarders, setting accelerators, biocides and colorants. The compliant coating 16 can be used in combination with any commercially available wallboard. At least in some embodiments, the compliant coating 16 can be applied at a manufacturing facility during a wallboard production process.

In some embodiments, a gypsum slurry is prepared and dispensed on a first paper cover sheet, the facer. A second paper cover sheet, the backer, is then rolled out to cover the gypsum slurry, and the gypsum slurry is now sandwiched between two paper sheets and is allowed to set at least partially. The compliant coating is then applied over the backer sheet and is allowed to polymerize/adhere to the backer. A third paper cover sheet is then rolled over the compliant coating. In some embodiments, yet another layer of the compliant coating can be applied over the third paper cover sheet and this second compliant coating is then may be further covered with a fourth paper cover sheet.

It will be appreciated that while in some embodiments, the gypsum slurry is allowed to set at least partially, in other embodiments the gypsum slurry is allowed to set completely before the compliant coating is applied. For example, wallboard can be manufactured and dried in an oven prior to the application of the compliant coating. In further embodiments, the compliant coating can be applied at any time after the gypsum slurry is covered with the backer paper cover sheet, including immediately or soon after the backer is applied over the gypsum slurry.

In further embodiments, the compliant coating can be applied at a job site to the backer side of any wallboard which has been already installed or any wallboard which is about to be installed.

As can be appreciated from FIG. 4A, the compliant coating is sandwiched between two paper cover sheets which are considered to be a stiff material, while the coating itself is compliant. This creates an acoustical wallboard which is a laminated structure in which at least one compliant layer, and in some embodiments several compliant layers, is laminated with at least one stiff cover layer which can be a paper cover layer in some embodiments, but can be prepared from some other stiff cover material such as for example, a fiber mat, polymeric mat, synthetic paper, plywood and the like.

The compliant coating comprises sound-compliant matrix into which sound-stiff particles are incorporated.

It will be appreciated that the term "compliant material" is used interchangeably with the term "sound-compliant material" and it is understood broadly in this disclosure to mean a material which is at least partially flexible and able to transfer, dissipate and/or absorb sound waves through its body at least partially. It will be further appreciated that the term "stiff material" is used interchangeably with the term "sound-stiff material" and is understood broadly in this disclosure to mean any material which is likely to reflect most of energy from sound waves rather than transfer, dissipate and/or absorb the sound waves.

In some embodiments, the compliant coating is a composition which comprises at least one binder and a combination of first particles which are mostly compliant with respect to sound transmission and second particles which are mostly stiff with respect to sound transmission. Thus, in some embodiments, the compliant coating is a sound-compliant matrix in which sound-stiff particles are incorporated.

At least in some embodiments, sound-compliant particles are larger in size than sound-stiff particles such that each sound-compliant particle is surrounded with several sound-stiff particles. In other embodiments, sound-compliant particles and sound-stiff particles are of about same size.

In some embodiments, sound-compliant particles and sound-stiff particles are used in the equal molar ratios. In other embodiments, sound-compliant particles are the main component and sound-stiff particles are used in only much smaller amounts. In other embodiments, this ratio is reversed.

In some embodiments, the molar ratio of sound-compliant particles to sound-stiff particles in the compliant coating is from 1:1 to 1:1,000. In other embodiments, the molar ratio of sound-compliant particles to sound-stiff particles is 1,000:1 to 1:1.

Various binders can be used in the compliant coating, including, but not limited to, glue, starch and a latex polymer. It will be appreciated that the term binder is used broadly and includes any adhesive material suitable for adhering to paper and/or gypsum core. In some embodiments, the adhesive is polyvinyl-acetate based glue, cellulose-based glue or a combination of the two types of glue.

At least in some embodiments, the compliant coating comprises rubber particles such as for example tire scrap which serves as sound-compliant particles which are glued together with sound-stiff nanometric silica particles, as shown in micrographs of FIGS. 4B and 4C, where FIG. 4B is an overview and FIG. 4C shows sound-stiff silica nanoparticles covering sound-compliant rubber particles at a higher resolution.

It will be further appreciated that any sound-compliant particles can be used, including, but not limited to, nitrile rubber, butyl rubber, ethylene propylene diene monomer (EPDM), natural rubber compounds, cotton fibers, organic fibers, inorganic fibers, polypropylene fibers, air-filled glass beads, polystyrene beads or polystyrene foam and GREEN GLUE™. It will be also appreciated that any sound-stiff particles can be used in the compliant coating. Such particles may include, but are not limited to, silica particles, clay particles, calcium carbonate, perlite, gas-filled microspheres, hollow microspheres, cenospheres and inorganic glues.

In some embodiments a combination of several sound-compliant materials can be mixed together with at least one sound-stiff material.

In some embodiments a combination of several sound-stiff materials can be mixed together with at least one sound-compliant material.

In some embodiments a combination of several sound-stiff materials can be mixed together with several sound-compliant materials.

In one preferred embodiment, the compliant coating is formed by mixing together rubber tire scrap particles with wallpaper paste and water glass. Water glass is then allowed to form a hard glassy gel. Various wallpaper pastes can be used in making the compliant coating. In some embodiments, the wallpaper paste comprises starch and/or methylcellulose.

Various starches can be used as a binder in the compliant coating, including modified starches. In some embodiments, the binder may comprise clay. In alternative or in addition, some other binders can be used in at least some embodiments. These binders may include starch, cellulose, methylcellulose, polyvinyl polymer, poly-acetate and any other polymer which can be used as an adhesive for holding together a combination of sound-compliant and sound-stiff particles and for adhering the combination of the particles to a paper cover sheet.

The invention will be now further described by the way of the following non-limiting examples.

Example 1. Acoustical Wallboard

Tire scrap (mean diameter-400 µm) was mixed with wallpaper paste, water glass and water in a ratio of 80:50:3:60 and the resulting solution was used for a ~0.07" thick coating over the backside of gypsum wallboard. A paper cover sheet was applied over the coating.

The compliant coating was oven-dried at 100° F.

While drying, water glass produces nanometric silica particles. In this case, the wallpaper paste with tire scrap acts as the compliant phase. The silica nanoparticles act as stiff inclusions in the compliant phase. SEM images of this coating are shown in FIGS. 4B and 4C, where FIG. 4B shows an overview, while FIG. 4C shows silica nanoparticles reinforced glue covering the tire scraps at a higher magnification.

Example 2. Comparative Analysis of Damping Capacity for Acoustical Wallboard

The acoustical wallboard was prepared as described in Example 1.

Two tests were conducted. In the first test, the damping capacity of individual acoustical wallboard coated with the compliant coating was determined in comparison to uncoated wallboard and laminated gypsum wallboard in which two gypsum wallboards were joined together. The set up for this test is shown in FIG. 5A, generally 20.

For comparing the damping capacity, an 8 inch×8 inch gypsum wallboard sample of ⅝" thickness (number 22 in FIG. 5A) was cut and was hung freely using a bungee cord at one corner. Then at a diametrically opposite corner of the hanging corner at a distance of 2' from both the sides of the corner impact was made on the facer manila paper side of the board 22 using a Bruel and Kjaer impact hammer shown as an arrow in FIG. 5A. An accelerometer 24 was mounted on the back paper side of the board 22 and sensed the acceleration response. An accelerometer 24 was in communication with a computer 26 which was equipped with PULSE software which analyzes both the impact and response. A Frequency Response Function was obtained for an acoustical wallboard of Example 1, uncoated wallboard and laminated wallboard in this test. The results of this test for three different wallboards are shown in FIG. 5B.

Figure 5B:
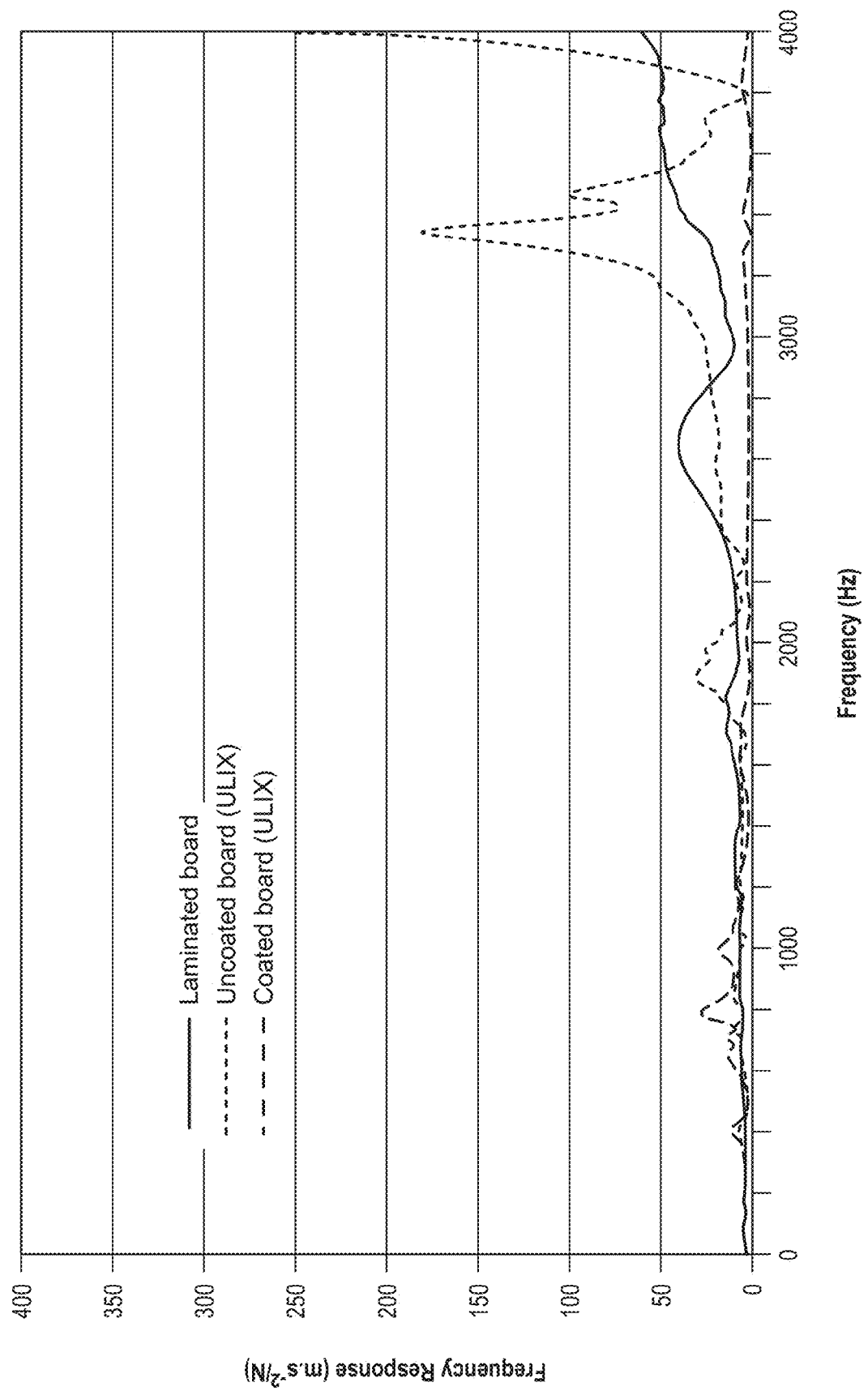
FIG. 5B reports results of frequency response measurements for a gypsum wallboard coated with a compliant coating (coated board, ULIX) in comparison to a wallboard (uncoated board, ULIX) and laminated wallboard (laminated board).

The impact hammer excites a range of frequencies plotted on the X axis of FIG. 5B. The Y axis in FIG. 5B is the Frequency Response Function at different frequencies. It shows the acceleration produced by the board per unit force applied, which is a measure of how well damped the system is. The higher is the Frequency Response Function, the lower is the damping capacity and vice versa. It can be seen from FIG. 5B that although the regular wallboard not coated with the compliant coating shows very high Frequency Response Function values and low damping, laminated board and acoustical wallboard coated with the compliant coating show very low Frequency Response Function, suggesting that these two systems are well damped.

The acoustical wallboard shows a very high damping capacity. One of the other advantages of the acoustical wallboard in comparison to a laminated board is the acoustical wallboard is almost 700-750 lb/msf lighter than the laminated board.

In the second test, the damping capacity of acoustical wallboard was examined after the acoustical wallboard was fixed to a stud. The set up for this test is shown in FIGS. 6A (side view) and 6B (front view), generally 30.

Figure 6A:
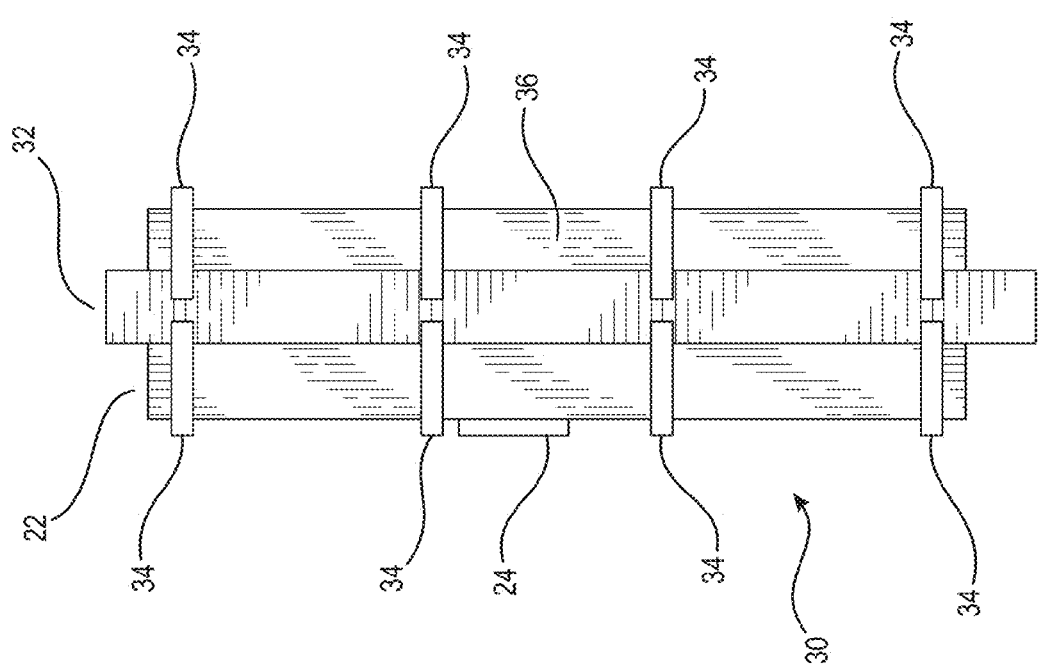
FIGS. 6A (side view) and 6B (front view) are a schematic of an experimental system for measuring frequency response from a building panel attached to studs with screws.
Figure 6B:
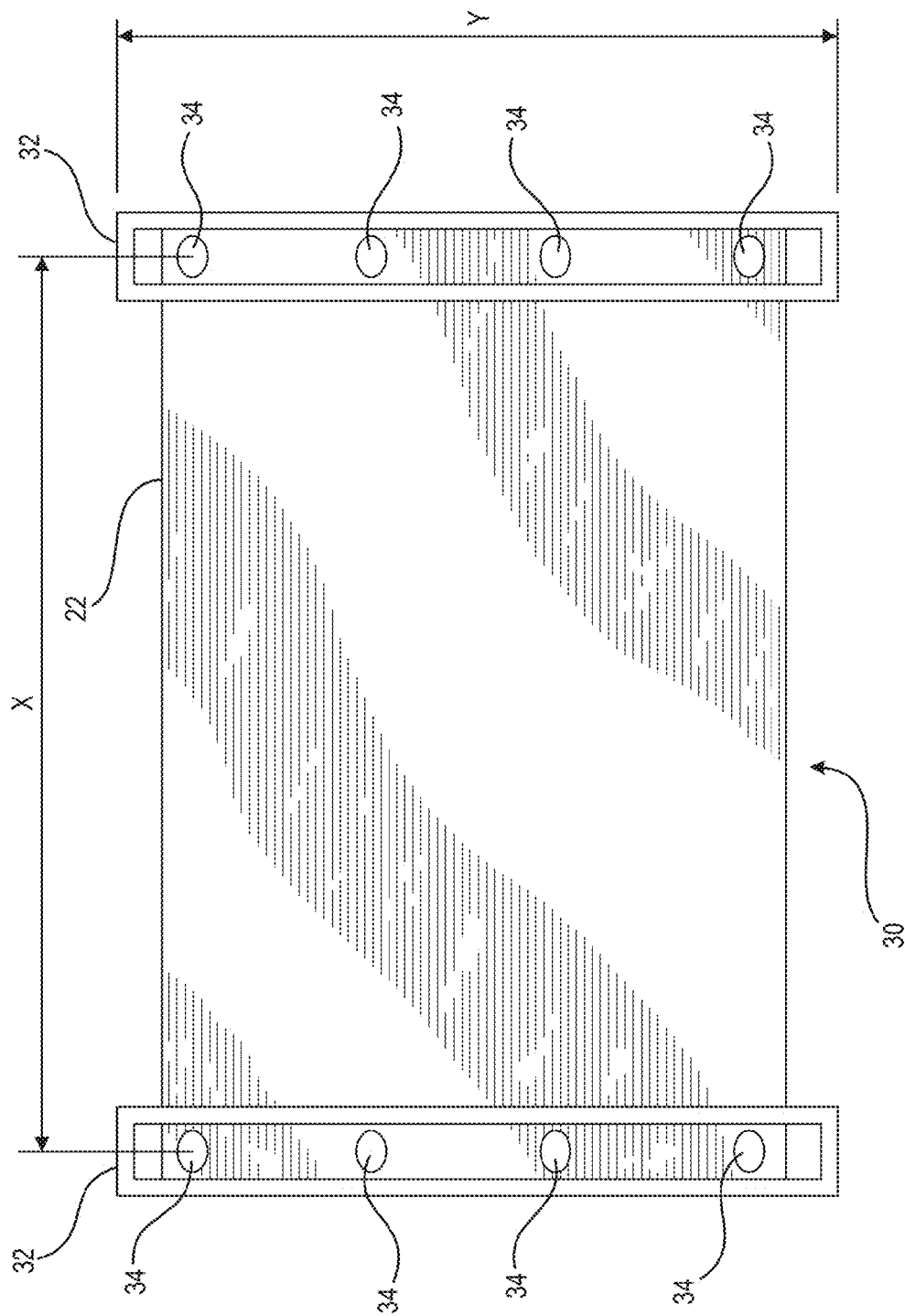
FIG. 6C reports results of frequency response measurements in the system of FIGS. 6A and 6B from an off-center area of a gypsum wallboard coated with a compliant coating (coated board ULIX) in comparison to a wallboard (uncoated board, ULIX) and laminated wallboard (laminated board).
FIG. 6D reports results of frequency response measurements in the system of FIGS. 6A and 6B from the center area of a gypsum wallboard coated with a compliant coating (coated board ULIX) in comparison to a wallboard (uncoated board, ULIX) and laminated wallboard (laminated board).

As shown in FIGS. 6A and 6B, for studying the effect of stud on the boards, the same boards as in the first test of FIG. 5A (25"×24"×⅝", referred to as number 22 in FIGS. 6A and 6B) are fixed to 25 gauge equivalent studs (each shown as element 32 in FIGS. 6A and 6B) of length of 28" (shown as Y in FIG. 6B) and 24" apart (shown as X in FIG. 6A). The boards 22 were fixed to the studs 32 by screws 34 at 8" apart. It can be seen from the side view of FIG. 6A that an accelerometer 24 is fixed at the center of the 5/8" regular wallboard 22.

As can be appreciated from FIG. 6A, a wallboard to be tested is fixed on the other side of the stud 32. This wallboard 22 is also shown in FIG. 6B which is the front view of the wallboard 22 to be tested. Two locations were tested. In one set up, a hammer was delivering an impact at the center of the wallboard 22 of FIG. 6B. In the other set up, a hammer was delivering an impact off the center (about 5 inches from the stud 32).

The Frequency Response Function was determined using the same setup as described above in connection with a first test for a free wallboard.

Figure 6C:
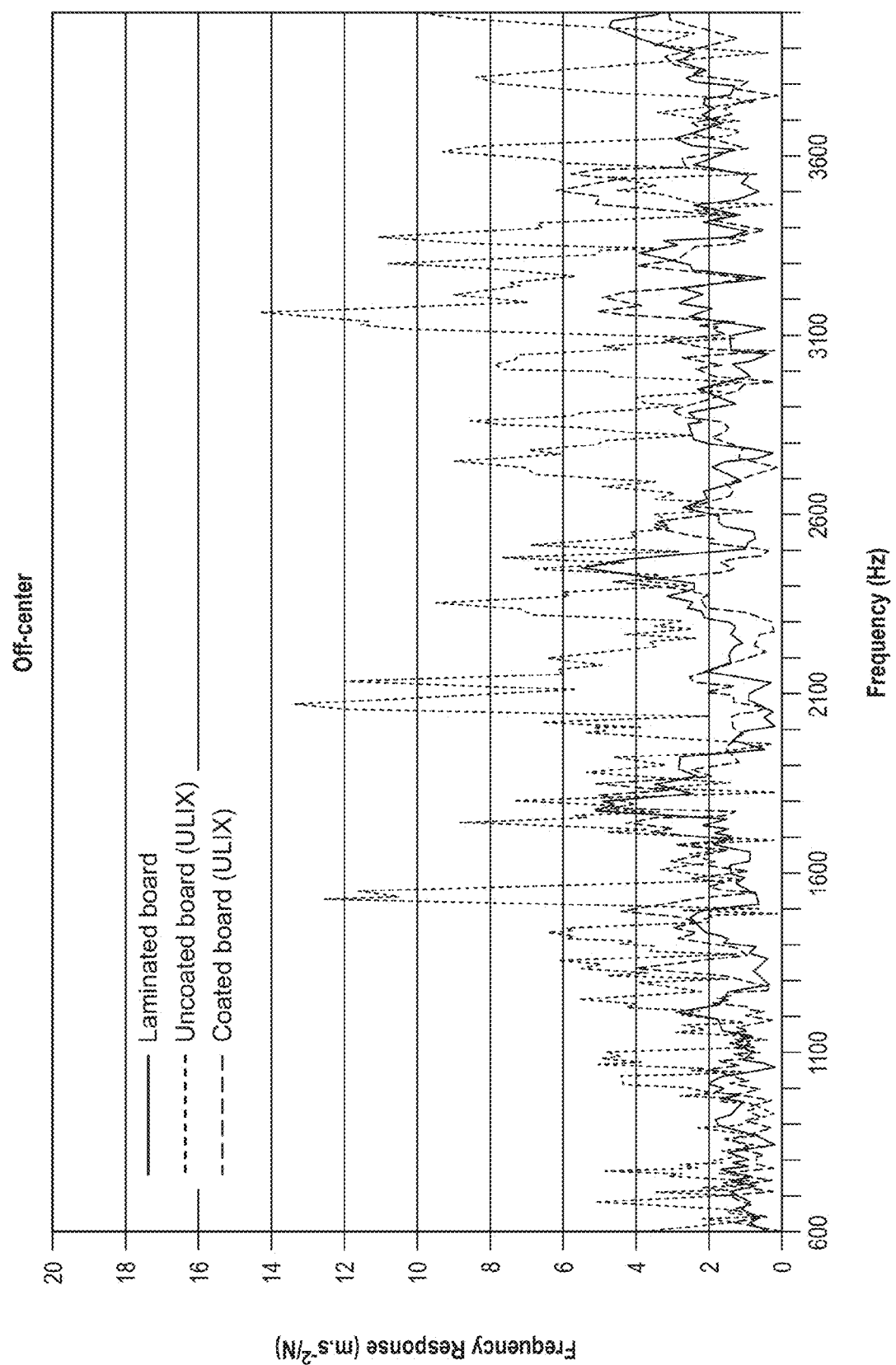

Accordingly, a Frequency Response Function graph was obtained for the acoustical wallboard, uncoated wallboard and laminated wallboard. The results for the off-center impact are shown in FIG. 6C. The results for at the center impact are shown in FIG. 6D.

Figure 6D:
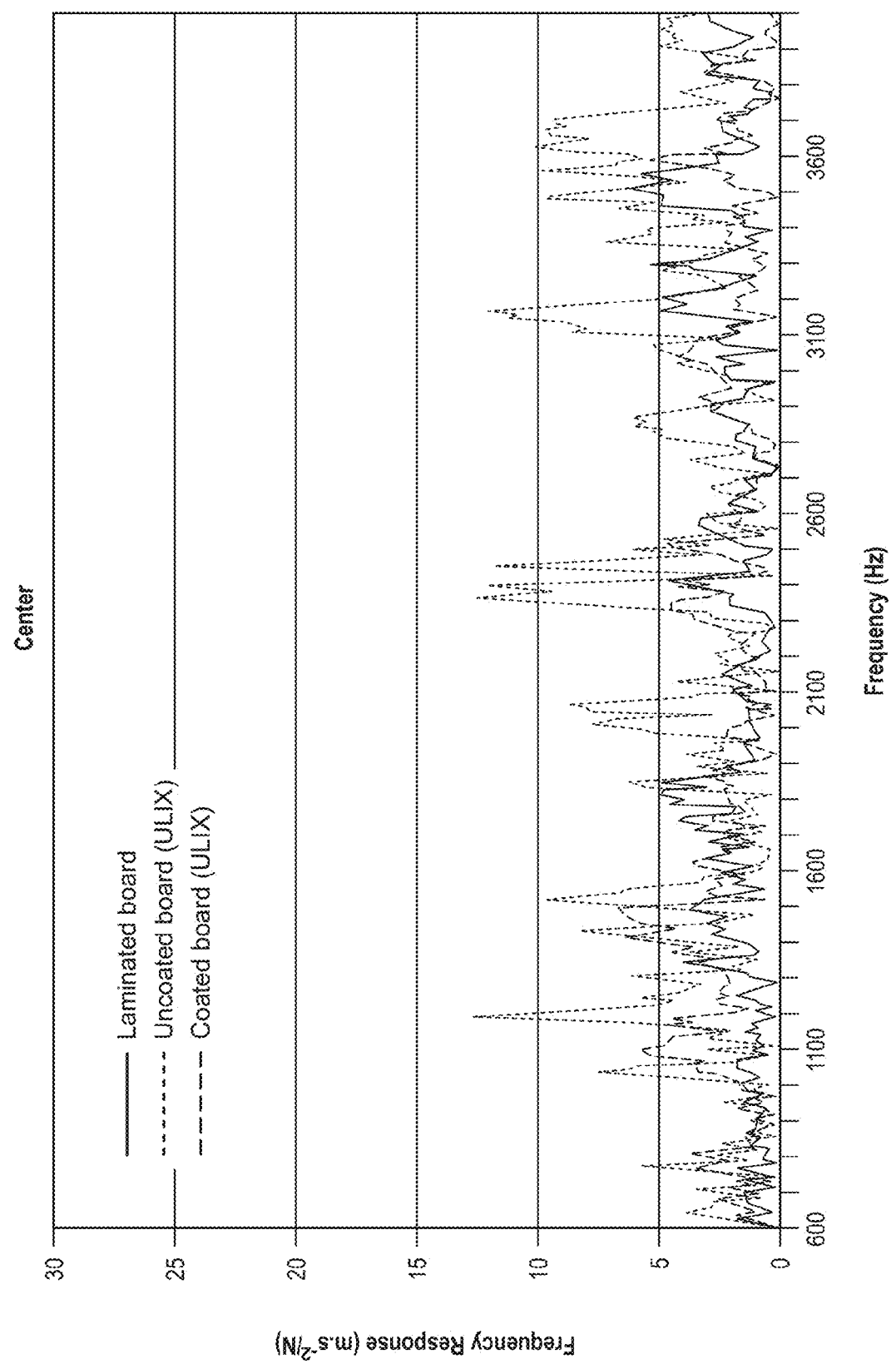

As can be appreciated from each of FIGS. 6C and 6D, the damping capacity of wallboard coated with the compliant coating is significantly improved in comparison to the uncoated wallboard.

What is claimed is:

1. An acoustical wallboard comprising:
    a wallboard comprising a gypsum core sandwiched between a first paper cover sheet and a second paper cover sheet, wherein the first paper cover sheet is the facer and the second paper cover sheet is the backer,
    a compliant coating comprising a binder, a matrix of sound-compliant particles into which sound-stiff particles are incorporated, wherein the compliant coating is applied directly over the backer; and
    a third paper sheet applied directly over the compliant coating, wherein the compliant coating and the third paper cover sheet create together a laminated structure.

2. The acoustical wallboard of claim 1, wherein the laminated structure is repeated at least two times.

3. The acoustical wallboard of claim 1, wherein at least one of paper cover sheets is replaced with a polymeric mat selected from the group consisting of a fiber mat and synthetic paper mat.

4. The acoustical wallboard of claim 1, wherein the molar ratio of sound-compliant particles to sound-stiff particles is from 1:1 to 1:1,000.

5. The acoustical wallboard of claim 1, wherein the molar ratio of sound-compliant particles to sound-stiff particles is from 1,000:1 to 1:1.

6. The acoustical wallboard of claim 1, wherein the compliant coating comprises a binder selected from the group consisting of glue, starch, a latex polymer and any combination thereof.

7. The acoustical wallboard of claim 1, wherein the compliant coating comprises a binder selected from the group consisting of polyvinyl-acetate based glue, cellulose-based glue and any combination thereof.

8. The acoustical wallboard of claim 1, wherein the compliant coating comprises rubber particles and silica particles.

9. The acoustical wallboard of claim 1, wherein the sound-compliant particles are selected from the group consisting of nitrile rubber, butyl rubber, ethylene propylene diene monomer (EPDM), natural rubber compounds, cotton fibers, organic fibers, inorganic fibers, polypropylene fibers, air-filled glass beads, polystyrene beads, polystyrene foam and any combination thereof.

10. The acoustical wallboard of claim 1, wherein the sound-stiff particles are selected from the group consisting of silica particles, clay particles, calcium carbonate, perlite, gas-filled microspheres, hollow microspheres, cenospheres, inorganic glues and any combination thereof.

11. The acoustical wallboard of claim 1, wherein the compliant coating comprises rubber tire scrap particles, wallpaper paste and water glass.

12. The acoustical wallboard of claim 1, wherein the gypsum core is sandwiched between the facer and the compliant coating and wherein the compliant coating is applied directly over the gypsum core; and
    a second paper sheet applied over the compliant coating.

13. The acoustical wallboard of claim 1, wherein the sound transmission loss property of the acoustical wallboard is improved in the high-frequency range in comparison to the sound transmission loss property of the wallboard to which no compliant coating is applied.

14. A method of imparting sound-absorbing properties to a gypsum wallboard, the method comprising:
    obtaining a gypsum wallboard;
    applying a compliant coating comprising a binder and a combination of first sound-compliant particles and second sound-stiff particles; and
    placing a paper cover sheet over the compliant coating.

15. A method of making a gypsum board, the method comprising:
    formulating a gypsum slurry from at least water and calcined gypsum;
    dispensing the gypsum slurry on a first paper cover sheet, the facer;
    rolling a second paper cover sheet, the backer, over the gypsum slurry;
    applying a compliant coating which comprises a binder, sound-compliant particles and sound-stiff particles over the backer sheet; and
    rolling a third paper cover sheet over the compliant coating.

16. The method of claim 15, wherein the compliant coating comprises rubber tire scrap particles, wallpaper paste and water glass.

17. The method of claim 15, wherein the compliant coating comprises a binder selected from the group consisting of glue, starch, a latex polymer and any combination thereof.

18. The method of claim 15, wherein the compliant coating comprises sound-compliant particles selected from the group consisting of nitrile rubber, butyl rubber, ethylene propylene diene monomer (EPDM), natural rubber compounds, cotton fibers, organic fibers, inorganic fibers, polypropylene fibers, air-filled glass beads, polystyrene beads, polystyrene foam and any combination thereof.

19. The method of claim 15, wherein the compliant coating comprises the sound-stiff particles selected from the group consisting of silica particles, clay particles, calcium carbonate, perlite, gas-filled microspheres, hollow microspheres, cenospheres, inorganic glues and any combination thereof.

* * * * *